United States Patent

[11] 3,627,837

| [72] | Inventor | Frederick J. Webb |
| | | Akron, Ohio |
| [21] | Appl. No. | 778,776 |
| [22] | Filed | Nov. 25, 1968 |
| [45] | Patented | Dec. 14, 1971 |
| [73] | Assignee | The Firestone Tire & Rubber Company |
| | | Akron, Ohio |

[54] GRAFTING OF PREFORMED POLYMER SIDE CHAINS ON METALATED BACKBONE POLYMER
15 Claims, No Drawings

[52] U.S. Cl. ................................................... 260/836,
260/876 R, 260/876 B, 260/877 R, 260/878 R,
260/879 R, 260/880 R, 260/880 B, 260/881 R,
260/884 R, 260/885 R, 260/886 R
[51] Int. Cl. .................................................. C08g 45/04,
C08f 15/00
[50] Field of Search ........................................... 260/836,
877, 878, 879, 880

[56] References Cited
UNITED STATES PATENTS

| 3,048,568 | 8/1962 | Cleary | 260/880 |
| 3,135,716 | 6/1964 | Uraneck | 260/880 |
| 3,468,972 | 9/1969 | Hsieh | 260/880 |
| 3,492,369 | 1/1970 | Naylor | 260/877 |

FOREIGN PATENTS

| 873,656 | 7/1961 | Great Britain | 260/877 |
| 1,144,151 | 3/1969 | Great Britain | 260/877 |
| 1,478,225 | 4/1967 | France | 260/877 |
| 1,225,863 | 9/1966 | Germany | 260/877 |

*Primary Examiner*—Paul Lieberman
*Attorneys*—S. M. Clark and Willard L. G. Pollard ABSTRACT: The process disclosed herein comprises the grafting of preformed polymer chains onto a metalated backbone polymer which has metal atoms such as lithium attached at various points along the polymer chain and the grafting preformed polymer chains have a functional group, such as a nitrile, or a ketone or an aldehyde group, which is capable of reacting with and replacing the metal atom attached to the backbone polymer. In this way grafted copolymers are prepared having sidebranches disposed according to the number and positioning of the metal atoms originally attached to the backbone polymer. In this way it is possible to make grafted copolymers of more uniform and more controllable side branching and therefore of improved properties.

GRAFTING OF PREFORMED POLYMER SIDE CHAINS ON METALATED BACKBONE POLYMER

BACKGROUND OF THE INVENTION

1. Field of the Invention

This invention relates to a process for preparing grafted copolymers and the product produced thereby. More specifically it relates to a process for preforming the branches to be grafted to a backbone polymer, and thereafter attaching the preformed branches to a metalated backbone polymer by reaction of a functional group present in the preformed sidebranches.

2. Description of the Related Prior Art

Graft copolymers are generally made by generating on a backbone polymer a number of free radical initiation sites. By adding a monomer to such a backbone polymer or having it present when the free radical initiation sites are generated, this monomer becomes attached to the backbone polymer at the initiation sites and polymerization is initiated at each of these sites by the addition of a number of monomer molecules to form polymeric sidechains. Anionic and cationic initiation sites can also be generated on a backbone polymer and grafts similarly produced by the addition of a number of monomer molecules to form polymeric side chains.

In each of these cases, the length of the polymeric side chain is unpredictable and often erratic in accordance with variations in the conditions under which the grafting is effected. These erratic results in the length and positioning of the side chain cause a considerable variation in the properties of the resultant grafted copolymers. It would be more desirable to be able to have the number and length of the grafted side chains controlled to give desired properties.

Copending application Ser. No. 606,011, filed by A. F. Halasa and D. P. Tate on Dec. 30, 1966, now abandoned discloses a method of lithiating various polymers in the presence of an amine in such a manner that active lithium atoms can be distributed along the polymer chain in any desired amount.

SUMMARY OF THE INVENTION

It has been found possible to produce grafted copolymers of controlled and more easily predictable and improved properties, by virtue of the more uniform length and more uniform distribution of side chains effected by attaching to a metalated backbone polymer, such as a butadiene polymer having a number of lithium atoms attached thereto, by reaction with a preformed polymer of selected chain lengths and having attached thereto a functional group which is capable of reacting with and displacing the metal, e.g. lithium, from the backbone polymer and thereby effecting attachment of the preformed polymer chains as grafted side chains.

The metalated backbone polymer is one having at least two, and preferably at least four, carbon-lithium or other reactive carbon-metal linkages. In addition to lithium, the metal atom can be sodium, potassium, calcium and cesium, the alkali metals being preferred. There are various known methods of attaching such metal atoms to polymer molecules, particularly by the addition of an alkyllithium or other alkyl metal such as butyllithium. The number of such metalated sites is determined somewhat by the relative proportion of butyllithium, etc., which is added to the backbone polymer, generally in solution. A particularly effective method of attaching active lithium in almost any desired amount along a polymer chain is described in the aforementioned copending application Ser. No. 606,011 now abandoned. Backbone polymers can be prepared having 0.001 to 1.0 percent by weight of lithium based on the weight of starting polymer.

The backbone polymer can be of various types, preferably hydrocarbon, but it can also have other groups therein provided they are nonreactive with the metal atoms attached to the polymer molecule. The backbone polymers should have unsaturation therein such as aliphatic or aromatic unsaturation to activate the carbon atoms to which the metal is to be attached. These are advantageously polymers and copolymers of conjugated dienes or of vinyl aromatics such as 1,3-butadiene, isoprene, 2,3-dimethyl-1,3-butadiene, piperylene, 2-phenyl-1,3-butadiene, styrene, vinyl toluene, vinyl naphthalene, vinyl diphenyl, vinyl methylnaphthalene, vinyl ethyl benzene, vinyl isopropyl benzene, alpha methyl styrene, alpha methyl vinyl naphthalene, and other vinyl and alpha methyl vinyl aromatic compounds having alkyl side chains, preferably having a total of no more than 10 carbon atoms in said alkyl side chains.

With copolymers it is possible to vary the proportion of the monomer which will furnish the sites for metalation, thereby providing another control for the number of metal atoms to be attached. Thus by limiting the number of such monomer units and having them distributed throughout the length of the backbone polymer chain it is possible to control the distribution of the metal atoms upon metalation and thereby ultimately have more uniform distribution of the grafted side chains. For example, by limiting the proportion of the butadiene, or styrene, etc., which is to provide the metal site, to a limited proportion such as 10 butadiene or styrene units per 100 total monomer units and by having these distributed somewhat uniformly throughout the polymer chain such as by having them separated from each other by approximately 10 comonomer units, it is possible by complete metalation of these ten units per polymer molecule to graft the preformed side chains only where the limited number of such sites are located and thereby control more uniformly the distribution of the side chains.

The preformed polymers which are to be grafted as side chains include those of the type listed above for the backbone polymer, as well as various other polymers having functional groups which can be attached to the backbone polymer by virtue of reaction with the metalated site. Such polymers can also have other functional groups which are present for the purpose of reaction with the metal.

The preformed polymers to be used for grafting as side chains are advantageously of controlled length. The length of the preformed polymer, as well as of the backbone polymer, can be varied according to properties desired. For example a relatively low molecular weight butadiene polymer can be used as the backbone polymer with a number of high molecular weight polystyrene preformed side chains to be grafted onto the backbone polymer so as to give more plastic properties. In contrast, a high molecular weight polymer of butadiene can be used as the backbone with a number of relatively low molecular weight preformed polystyrene polymers to be grafted onto the backbone so as to give more rubbery properties. The molecular weight of the polymer can be controlled somewhat by the amount of polymerization catalyst with larger amounts of catalyst producing lower molecular weight polymers and smaller amounts of catalyst producing higher molecular weight polymers.

Specific polymers suitable for the side chain grafting include olefin, vinyl aromatic and diene types, such as polybutadienes, polyisoprenes, polystyrenes, butadiene-styrene copolymers, butadiene-isoprene copolymers, isobutylene-isoprene copolymers (the copolymer commonly called butyl rubber and the like), unsaturated ethylene-propylene terpolymers (the copolymer commonly called EPT or EPDM rubber and the like); homologous polymers derived from homologs of butadiene, styrene, etc., such as dimethyl butadiene, the methyl styrenes; polyethylene, polypropylene, polybutene-1, and the like. The only requirements of the preformed polymers are that they are capable of having the functional group attached thereto and that they do not have other groups therein that would react with or retain the metal in the backbone polymer.

The grafting process of this invention can be carried out at temperatures ranging from −70° C. to +150° C., but preferably in the range of 0° to 100° C., the upper temperature being limited by the thermal stability of the reagents and products. The lower temperature is limited by considerations of production rate, the rate of reaction becoming unreasonably slow at low temperatures.

It is desirable that the preformed polymers to be added as side chains are of a length and character to give the desired properties after being grafted on the backbone polymer. For that reason it is desirable either to control the molecular weight of the preformed polymers during preparation, or to be able to separate selected fractions of the preformed polymers so as to give the controlled molecular weight desired for the side chains.

The particular method used in attaching a functional group is not critical. Preferably the functional group is at the end of a preformed polymer chain and advantageously there is only one such functional group per polymer molecule.

A preferred method of adding the functional group is to prepare the prepolymer by an anionic polymerization whereby a metal atom such as lithium or sodium is left at the end of the polymer chain. In this way the lithium, sodium, etc., can be used to react with a compound preferably having no more than 20 carbon atoms such as cyanogen chloride (ClCN), γ-chloropropionacetal, N,N-dimethylacetamide, esters, such as ethyl benzoate, ethyl acetate, etc., phosgene, epoxides having the formula

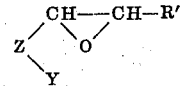

wherein R' is H or a hydrocarbon group, Z is a divalent group, hydrocarbon or substantially all hydrocarbon, and Y is an epoxide or another functional group capable of reacting with the metal for attachment to Z, such as diglycidyl ether of bisphenol, butadiene diepoxide, glycidylaldehyde, glycidyl acetone, and the like. In this way it is possible to remove the sodium or lithium by reaction with the compound and substitute a functional group, for example in these cases —CN, —CH$_2$CH$_2$CHO, —C(O)CH$_3$, —C(O)C$_6$H$_5$, —COCl,

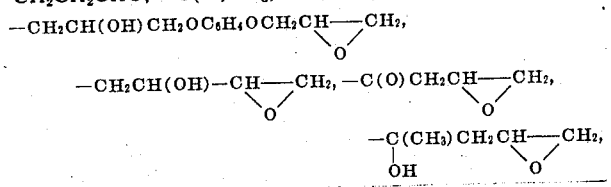

and the like.

Typical difunctional compounds that can be used for this purpose include butadiene dioxide (1,2,3,4-diepoxybutane), 1,2,5,6-diepoxy hexane, glycidaldehyde (2,3-epoxypropionaldehyde), 3,4-epoxybutyraldehyde, 3,4-epoxyvaleraldehyde, 1,2,4,5-diepoxy3-pentanone, 1,2,4,5-diepoxy-3-hexanone, limonene dioxide, diepoxyethers of ethylene glycol such as bisepoxydicyclopentyl ether of ethylene glycol and the corresponding thioethers, dicyclo diepoxy carboxylates such as (2-methyl-4,5-epoxycyclohexyl)methyl 2-methyl-4,5-epoxycyclohexyl carboxylate, 1,2,5,6,9,10-triepoxydecane, 1,2,11,12-diepoxy-5,8-dioxadodecane, 1,2,9,10-diepoxy-4,7-dithiadecane, 1,2,16,17-diepoxy-6,9,12-trithiaheptadecane, 1,2,12,13-diepoxy-4,7,10-trioxahexadecane, 4,5,9,10-diepoxydecanal, 4,5,9,10,13,14-triepoxytetradecanal, 1,2,11,12-diepoxy-8-pentadecanone, 2,3,18,19-diepoxy-7,14-eicosanedione, 3,4-epoxybutyl 5,6-epoxyhexanoate, 5,6-epoxydecyl, 5,6-epoxydecanoate, and the like. When the terminating reagent is a ketone or ester, the alkali metal polymer reacts with the carbonyl group leaving the epoxy group intact.

In such reactions it is important to use an excess of the function-adding reagent so as to avoid reaction with both functional groups. It is desirable therefore to use at least two and preferably at least three moles of such reagent per lithium or other metal atom to be reacted. Then excess reagent can be removed after the metal reaction is completed, by extraction, vaporization, precipitation of polymer or other appropriate means. It is also advantageous to add the metalated preformed polymer to the difunctional reagent so that, in the event of insufficient or inadequate stirring, a localized concentration of metalated polymer is less likely to occur, thereby reducing the possibility that a particular molecule of the difunctional compound will have both functional groups subjected to reaction with metal atoms in the polymers.

It is also possible to prepare a block polymer, first using the monomer desired for the side chain and then using a small amount of monomer having the desired functional group, such as acrylonitrile, dialkylamide, e.g. N,N-dimethylacrylamide, acrylyl chloride, acrylic esters, e.g. methyl methacrylate, etc. For example the initial monomer can be ethylene, propylene, styrene, 1,3-butadiene, etc., and when the desired length of the polymer is obtained as desired for the side chain, the acrylonitrile can be added. In such case however, it is desirable to have a few as possible of the acrylonitrile repeating units on the polymer molecules. Moreover it is important to make sure that all or as many as possible of the polymer molecules have the terminus comprising acrylonitrile repeating units, since this will determine the number of such polymer molecules that become grafted to the backbone polymer. In order to enhance the possibilities of having only a few acrylonitrile repeating units at the end of the prepolymer, and preferably only one if possible, and to have the greatest number of such prepolymer molecules fixed to acrylonitrile repeating units, it is desirable to use a dilute solution of the metalated prepolymer when the acrylonitrile is added.

The grafting technique of this invention is illustrated by the following reaction in which the backbone polymer (A) has four lithium atoms attached to a polystyrene polymer and the prepolymer (B) which is reacted therewith has a relatively short chain length 1,4-polybutadiene with a terminal cyano radical attached thereto by reaction with cyanogen chloride. Slightly more than the stoichiometric amount of the functional prepolymer is used as is calculated to replace the four lithium atoms on the backbone polymer. The resultant imino product is treated with water or dilute acid to convert the imino groups to keto as shown in the final reaction immediately below.

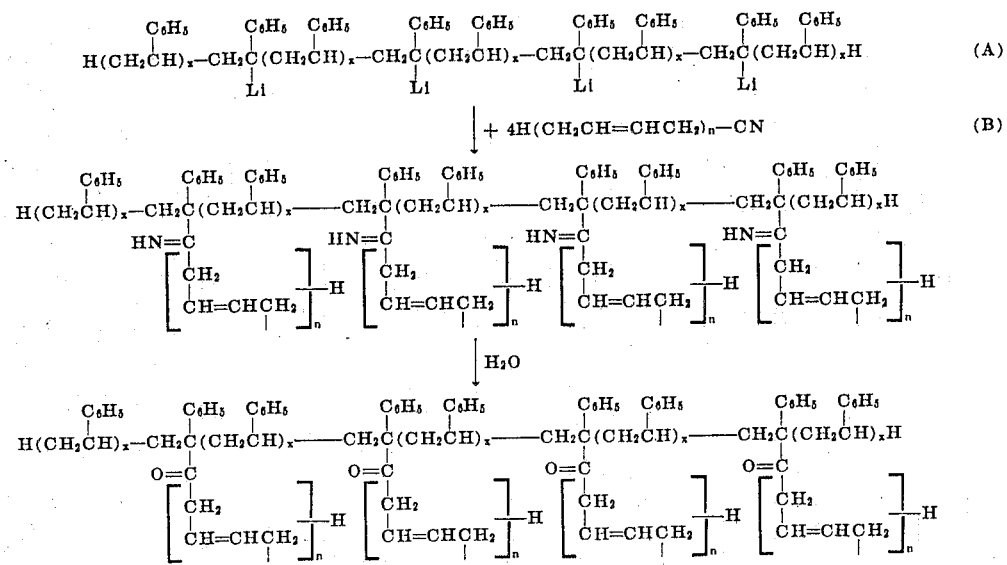

The invention is best illustrated by the following examples. These examples are presented for purpose of illustration and are not intended to limit in any way the scope of the invention nor the manner in which it may be practiced. Unless specifically indicated otherwise, parts and percentages are given by weight.

EXAMPLE I

Preparation of Metalated Backbone Polymer a. A 10 percent of polystyrene polymer in benzene having a molecular weight of about 50,000 is placed in a flask previously flushed with nitrogen. To this is added a solution of butyllithium in sufficient amount to provide slightly more than four lithium atoms per polymer molecule and then N,N,N′,N′-tetramethyl ethylene diamine is added in equimolar amount based on the amount of lithium. After the two solutions are thoroughly mixed, the bottle is maintained at 50° C. for 3 hours. The product is found to contain approximately four lithium atoms attached to each polymer molecule.

b. The procedure of paragraph (a) is repeated using in place of the butyllithium, a solution of an equivalent amount of sodium naphthalene to give a polymer having four sodium atoms attached per polymer molecule.

c. The procedure of paragraph (a) is repeated using in place of the butyllithium a solution of an equivalent amount of potassium naphthalene and the product has an average of four potassium atoms attached per polymer molecule.

d. The procedure of paragraph (a) is repeated using in place of the butyllithium a benzene solution of an equivalent amount of diphenyl calcium and the resulting polymer has an average of approximately four calcium atoms attached per polymer molecule.

EXAMPLE II

Preparation of Preformed Polymer for Side chains a. A solution of 16.6 g. of styrene in 200 ml. of tetrahydrofuran is prepared in a nitrogen atmosphere using styrene and tetrahydrofuran that had been dried and distilled under nitrogen. The solution is prepared in a flask that is subsequently sealed with a cap having a rubber membrane portion and is then cooled to 0° C. in an ice bath. To this solution is added by syringe through the membrane a solution of 1.6 millimoles of n-butyllithium in hexane. This is allowed to polymerize for one hour at 0° C. The resulting polymer has a lithium atom at one end thereof.

The procedure of above paragraph (a) is repeated a number of times using in each case an equivalent amount of a different metal catalyst as indicated below to give a preformed polymer having the corresponding metal at the ends thereof:

b. Phenyl sodium
c. Phenylisopropyl potassium

The procedure of above paragraph (a) is repeated a number of times using individually in place of the styrene monomer equivalent amounts respectively of:

d. Vinyl toluene
e. 1,3-Butadiene (with hexane as solvent)
f. Isoprene (with hexane as solvent)

In each case polymers are obtained having active metal on one end of the polymer chains.

EXAMPLE III

Attachment of Functional Groups to Preformed Polymer a. The solution of polymer prepared in example II(a) having terminal lithium atoms on the polymer molecules is reacted with approximately 3 moles of cyanogen chloride per atom of lithium. The reaction is conducted with stirring at room temperature and is completed within 30 minutes. The reaction product is found to be the same polymer with a terminal nitrile radical attached thereto. The polymer is separated from the unreacted cyanogen chloride by precipitation with anhydrous methanol or other nonsolvent for the polymer. Then the polymer is redissolved in tetrahydrofuran or other suitable solvent for subsequent reaction with metalated backbone polymers.

b. The procedure of above paragraph (a) is repeated a number of times using individually in place of the lithium polymer, equivalent amounts respectively of the sodium polymer of example II(b) and the potassium polymer of example II(c). Similar results are obtained as in example III(a).

c. The procedure of above paragraph (a) is repeated using the polybutadiene polymer produced according to example II(e).

EXAMPLE IV

Reaction of Backbone Polymer with Preformed Polymer Having Functional Group a. A backbone polymer of polystyrene metalated as in example I(a) so as to have an average of about four lithium atoms attached per polymer molecule is dissolved in tetrahydrofuran (previously carefully dried) and sufficient of the polybutadiene-nitrile prepolymer prepared in example III(c) is dissolved in xylene and added to the above backbone polymer solution so that there is slightly more than an equivalent weight of the nitrile prepolymer per lithium atom in the backbone polymer. After intimate mixture, the resultant solution is maintained at 50° C. for 17 hours. The resultant polymer solution is treated with water in an amount to provide approximately 3 moles of water per imino radical as indicated in the schematic diagrams above. The resultant mixture is heated with agitation for a period of two hours to insure that the imino groups are completely converted to keto groups. The polymer is precipitated by pouring the solution into methanol. The number of keto groups is determined by infrared analysis and from the molecular weight determination it is possible to calculate the number of grafted side chains per polymer molecule. This is done after the polymer has been treated with hexane to dissolve the grafted polymer from the product. The grafted copolymer is soluble in this solvent and therefore is separated from the unreacted backbone polymer. The grafted copolymer is found to have improved properties with regard to tensile strength as compared to corresponding grafted copolymers in which the same backbone polymer is grafted by adding butadiene monomer to the metalated backbone polymer under polymerization conditions. Injection and compression molded products of improved impact properties are made from this material.

b. The procedure of example IV(a) is repeated a number of times using individually instead of the preformed polymer used therein the preformed isoprene polymer of example II(f). Improved results are obtained with respect to adhesive properties as compared to the use of the corresponding monomers for simultaneous polymerizing and grafting onto the same metalated backbone polymer.

EXAMPLE V

Preparation an Metalation of Butadiene Backbone Polymer

A 28 oz. beverage bottle is washed, dried overnight at 110° C. and flushed with nitrogen before being capped with a 3-hole metal cap having a rubber liner, pressured to 10–20 p.s.i. with nitrogen and allowed to cool. To this bottle is transferred a monomer solution of 1,3-butadiene (which had previously been treated with mercuric sulfate to remove acetylenic impurities) which contains 46 grams of butadiene and 253 grams of n-heptane. The monomer solution is introduced into the bottle through the rubber cap lining. A few grams of butadiene are boiled out of the bottle by heating on a sand bath with the cap removed. This insures the removal of any traces of oxygen. The bottle is then recapped and catalyzed with n-butyllithium in n-heptane which is added by syringe in a proportion of 1 millimole per 100 grams of monomer. The bottle is placed in a water bath at 50° C. on a device which rotates the bottle end over end. The polymerization is thus conducted for 16 hours, following which the bottle is removed and found to contain a viscous pale yellow polymer solution. The backbone polymer in the solution is metalated by syringing into the bottle a solution containing 10 millimoles of n-butyllithium in heptane and then 15 millimoles of N,N,N',N'-tetramethylethylenediamine in heptane. The resulting metalated polymer is used in the grafting operations of example VI.

EXAMPLE VI

A sample of the metalated butadiene backbone polymer prepared in Example V is reacted in accordance with the procedure of example IV using an equivalent amount of polystyrene-nitrile prepolymer (prepared as in example III(a)), based on the amount of lithium in the backbone polymer. The resulting grafted copolymer has improved properties with respect to tensile strength, green strength, elongation and traction on wet surfaces when used as a tire composition as compared to the grafted copolymers prepared by simultaneously polymerizing and grafting styrene monomer to another sample of the same metalated butadiene backbone polymer.

EXAMPLE VII

EPT rubber (ethylene-propylene-1,4-hexadiene), produced by E. I. du Pont de Nemours & Co. and known as Nordel 1040 rubber is dissolved in hexane to form a cement containing 14 percent by weight of polymer. Of this stock of cement, 725 grams (containing about 100 grams polymer) is added slowly to 2,000 cc. of acetone with continuous, vigorous agitation to precipitate the elastomer as white crumbs. The crumbs are separated from the liquid phase and dried in a vacuum oven at 70° C. overnight. The polymer is then subject to high vacuum pumping (fractional mm.) for 7 hours. The polymer thus purified is used for metalation runs. Into a 28-ounce container of the type commonly used in polymerization research is placed 29 grams of EPT, purified as above. A lamp-grade nitrogen atmosphere is established and hexane is added to make a cement containing 10.8 percent polymer. In order to effect metalation of the EPT at alpha-methylene groups, the following ingredients, constituting the metalating agent, are added:

|               | mMphp* | Added As                    |
|---------------|--------|-----------------------------|
| n-Butyllithium | 217    | 39.6 cc. of 1.59            |
|               |        | molar solution              |
| TMEDA         | 272    | 12.1 cc. neat               |

* Millimoles per 100 parts of polymer.

The bottle containing the reaction mixture is rotated in a water bath maintained at 50° C. for 16 hours, to bring about metalation of the polymer, after which the bottle is removed from the water bath and brought to room temperature.

Samples of the metalated polymer produced as described above are reacted successfully for the addition of preformed side chains by the procedures of examples II an IV. EXAMPLE VIII The procedure of example I(a) is repeated a number of times to produce metalated backbone polymers of polystyrene, polyalphamethyl styrene, polyvinyl toluene and polyisoprene which are each successfully grafted with preformed side chains in accordance with examples II(a), III(a) and IV using styrene, isoprene, propylene, vinyl toluene and vinyl naphthalene respectively to prepare the preformed polymer side chains for each of the respective backbone polymers.

EXAMPLE IX

The procedure of example III is repeated a number of times using individually in place of the cyanogen chloride equivalent amounts respectively of γ-chloropropionacetal, N,N-dimethylacetamide, ethylbenzoate, phosgene, diglycidyl ether of bisphenol and butadiene diepoxide. The resultant polymers, having aldehyde, acetyl, benzoyl, chloroformyl and epoxy radicals respectively attached, are each substituted for the preformed polymer side chains used in example VIII with successful attachment of the preformed polymers as side chains to the backbone polymers of example VIII.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:

1. The process of preparing grafted copolymers from a metalated backbone polymer having at least two metal atoms attached to the polymer chain thereof selected from the class consisting of Li, Na, K, Cs and Ca and a preformed polymer of selected molecular weight, the molecular weight of said preformed polymer being selected according to the length of the desired side chains to be attached to said backbone polymer and said preformed polymer having attached thereto a functional group selected from the class consisting of nitrile, keto, aldehyde, acid halide, ester and epoxide comprising the steps of:

a. mixing said preformed polymer having a functional group attached thereto with said metalated backbone polymer in a proportion of said preformed polymer molecules equivalent to the number of said preformed polymer molecules which are to be attached as side chains to said metalated backbone polymer;

b. maintaining said preformed polymer containing functional groups in intimate contact with said metalated backbone polymer at a temperature of 0° to 150° C. until a substantial number of the metal atoms on said backbone polymer have been replaced by the reaction of the functional groups in said preformed polymer; and c. thereafter removing the resultant grafted copolymer from unreacted materials; said backbone polymers comprising polymers of one or more monomers selected from the class consisting of conjugated dienes having 4–10 carbon atoms and vinyl and alphamethylvinyl aromatic hydrocarbons and nuclear alkyl derivatives thereof having no more than 10 carbon atoms in alkyl derivative groups therein; said preformed polymers comprising one or more monomers selected from the class consisting of those listed for said backbone polymers and olefins of 2–4 carbon atoms.

2. The process of claim 1 in which said functional group is a nitrile group and the grafted copolymer is subsequently treated with water to convert the resultant imino radicals into keto radicals.

3. The process of claim 1 in which said backbone polymer is a polyethylene having an average of at least four atoms of lithium per polymer molecule.

4. The process of claim 1 in which said backbone polymer is a polystyrene having an average of at least four atoms of lithium per polymer molecule.

5. The process of claim 1 in which said backbone polymer is a polybutadiene having an average of at least four atoms of lithium per polymer molecule.

6. The process of claim 1 in which said backbone polymer has an average of at least four atoms of lithium per polymer molecule.

7. The process of claim 6 in which said functional group attached to said preformed polymer is a nitrile group.

8. The process of claim 6 in which said functional group is attached to said preformed polymer is selected from the class consisting of nitrile, propionacetal, N-methylamide, chloroformyl, epoxide and ester groups.

9. The process of claim 8 in which said group is a propionacetal group.

10. The process of claim 8 in which said group is an N-methylamide group.

11. The process of claim 8 in which said group is a chloroformyl group.

12. The process of claim 8 in which said group is an epoxide group.

13. The process of claim 8 in which said group is an ester group.

14. The process of claim 8 in which said preformed polymer is further polymerized to add at least one repeating unit of a commoner having a functional group therein selected from the class consisting of nitrile, ester and dialkylamide.

15. The process of claim 13 in which said comonomer is acrylonitrile.

* * * * *